(12) United States Patent
Bai

(10) Patent No.: US 12,497,122 B2
(45) Date of Patent: Dec. 16, 2025

(54) SELF-BALANCING VEHICLE

(71) Applicant: Foshan Shunde Mingsheng Hardware Plastic Technology Co., Ltd., Foshan (CN)

(72) Inventor: Shigang Bai, Foshan (CN)

(73) Assignee: Foshan Shunde Mingsheng Hardware Plastic Technology Co., Ltd., Foshan (CN)

( * ) Notice: Subject to any disclaimer, the term of this patent is extended or adjusted under 35 U.S.C. 154(b) by 479 days.

(21) Appl. No.: 18/110,279

(22) Filed: Feb. 15, 2023

(65) Prior Publication Data
US 2023/0192224 A1 Jun. 22, 2023

Related U.S. Application Data

(63) Continuation of application No. PCT/CN2021/123159, filed on Oct. 12, 2021.

(51) Int. Cl.
*B62K 11/00* (2006.01)
*B62J 43/28* (2020.01)
(Continued)

(52) U.S. Cl.
CPC .............. *B62K 11/007* (2016.11); *B62J 43/28* (2020.02); *B62J 45/20* (2020.02); *B62K 21/00* (2013.01); *B62K 2202/00* (2013.01)

(58) Field of Classification Search
CPC ...................................................... B62K 11/007
(Continued)

(56) References Cited

U.S. PATENT DOCUMENTS

| 10,035,557 B2* | 7/2018 | Chang ................ B62K 11/007 |
| 2012/0166048 A1* | 6/2012 | Inoue ................ G05D 1/0238 |
| | | 701/49 |
| 2017/0106739 A1 | 4/2017 | Gillett | |

FOREIGN PATENT DOCUMENTS

| CN | 202966533 U | 6/2013 |
| CN | 103552635 A | 2/2014 |

(Continued)

OTHER PUBLICATIONS

Wu Zhenlei, Ye Jinhan, Analysis and Implementation of a Control Modelfor a Two-Wheeled Self-Balancing Vehicle, «Light Industry Science and Technology» Issue 6, Jun. 11, 2018, pp. 83-84.

*Primary Examiner* — Valentin Neacsu
*Assistant Examiner* — Hosam Shabara
(74) *Attorney, Agent, or Firm* — JEEN IP LAW, LLC

(57) ABSTRACT

A self-balancing vehicle includes: a pedal base and a control rod, a lower portion of the control rod is provided with a steering shaft capable of rotating along with swinging of the control rod, and the steering shaft is rotatably connected with the pedal base. The self-balancing vehicle further includes: a transmission member and a mainboard box used to install a control mainboard; the transmission member is connected with the steering shaft, so as to rotate with the rotating of the steering shaft; the mainboard box is hinged in a cavity of the pedal base and located within a rotation interference range of the transmission member, and when the transmission member rotates, the mainboard box rotates or swings with interference of the transmission member. Through mechanical signal transmission, it can get rid of the limits of the Hall assembly, thus reducing the diversity requirements and costs of the control mainboard.

18 Claims, 7 Drawing Sheets

(51) Int. Cl.
 *B62J 45/20* (2020.01)
 *B62K 21/00* (2006.01)
(58) Field of Classification Search
 USPC .......................................................... 180/6.5
 See application file for complete search history.

(56) References Cited

FOREIGN PATENT DOCUMENTS

| | | | | |
|---|---|---|---|---|
| CN | 207670584 U | | 7/2018 | |
| CN | 112623088 A | * | 4/2021 | ............. B62M 7/12 |
| CN | 213083398 U | * | 4/2021 | |

* cited by examiner

SELF-BALANCING VEHICLE

TECHNICAL FIELD

The disclosure relates to the field of self-balancing vehicles, in particular to a self-balancing vehicle (e.g., self-balancing scooter).

BACKGROUND

Self-balancing vehicles, also known as sensor controlled vehicles, or segways, etc. There are two main types of self-balancing vehicles in the market: one-wheel and two-wheel. Its operation principle is mainly based on a basic principle called "Dynamic Stabilization". The gyro and acceleration sensor inside a vehicle body of the self-balancing vehicle are used to detect the change of attitude of the vehicle body, and the servo control system is used to accurately drive the motor to make corresponding adjustments to maintain the balance of the system.

In the related art, the self-balancing vehicle includes a pedal base, a control rod and a Hall assembly, a lower portion of the control rod is provided with a steering shaft (generally swinging left and right) capable of rotating along with swinging of the control rod, the steering shaft is rotatably connected with the pedal base, when the self-balancing vehicle needs to steer, a user standing on the pedal base adjusts the control rod to swing in a corresponding direction, the control rod drives the steering shaft to rotate, a rotating signal generated by the steering shaft is obtained by the Hall assembly and fed back to a control mainboard, and the control mainboard sends a signal to hubs of the self-balancing vehicle to make a corresponding steering action; However, due to the use of the Hall assembly, the control mainboard cannot be used in different self-balancing vehicles (with and without the control rod), there is no Hall assembly on the control mainboard of the self-balancing vehicle without the control rod; In addition, the control mainboard with the Hall assembly of the self-balancing vehicle with the control rod is expensive, which seriously restricts the market competitiveness of self-balancing vehicles with control rods.

SUMMARY

With regard to the above-mentioned technical problem, a main purpose of the disclosure is to provide a self-balancing vehicle, which gets rid of the limit (no Hall steering) of the Hall assembly through a mechanical signal transmission mode, so that the control mainboard of the self-balancing vehicle without the control rod can be applied to the self-balancing vehicle with the control rod, the control function of the high-cost control mainboard is replaced with the low-cost control mainboard, the performance is stable, the cost is greatly reduced, and the market competitiveness of the product is improved.

In order to achieve the above purpose, the disclosure provides a self-balancing vehicle, including a pedal base and a control rod, a lower portion of the control rod is provided with a steering shaft capable of rotating along with the swinging of the control rod, the steering shaft is rotatably connected to the pedal base; and the self-balancing vehicle further includes: a transmission member and a mainboard box configured to install a control mainboard; the transmission member is connected with the steering shaft, thereby the transmission member is capable of rotating along with the rotating of the steering shaft; and the mainboard box is hinged in a cavity of the pedal base and located within a rotation interference range of the transmission member, and when the transmission member rotates, the main board box rotates or swings with interference of the transmission member.

In an embodiment, the transmission member is hinged on the mainboard box;

or, an end of the transmission member is provided with a U-shaped groove with an opening outward, and the mainboard box is provided with a transmission platform capable of extending into the U-shaped groove;

or, the mainboard box is located at a side of the steering shaft, the transmission member is fixed on the steering shaft, and the transmission member is suspended at an upstream of a starting position of rotating or swinging of the mainboard box.

In an embodiment, the transmission member is of strip plate structure, and ends of the transmission member are provided with bending parts extending vertically outward, respectively.

In an embodiment, the self-balancing vehicle further includes hubs and a support shaft, the hubs are installed at ends of the support shaft respectively, and the support shaft is extended along a length direction of the pedal base; and the mainboard box is hinged on a shaft rod of the support shaft.

In an embodiment, the self-balancing vehicle further includes an elastic member, disposed in the cavity of the pedal base; an end of the elastic member is connected with an inner wall of the cavity of the pedal base, and another end of the elastic member is connected with an end face of the mainboard box.

In an embodiment, the self-balancing vehicle further includes an elastic member and an undertaking platform, the undertaking platform is fixed in the cavity of the pedal base and form a reset space together with the mainboard box; and the elastic member is disposed in the reset space, an end of the elastic member is connected with the undertaking platform, and another end of the elastic member is connected with the mainboard box.

In an embodiment, the undertaking platform is fixedly connected to a support shaft configured to install hubs and disposed in the cavity of the pedal base; the mainboard box is provided with a mounting gap for the support shaft to pass through; and the mounting gap is provided with a bearing block therein, the support shaft is rotatably threaded through the bearing block, and the bearing block is fixedly connected with the mainboard box; and the mainboard box further includes a cover plate covering the mounting gap, the undertaking platform is located in the mounting gap and under the cover plate, a lower end of the elastic member is connected with an upper end face of the undertaking platform, and an upper end of the elastic member is connected with an inner end face of the cover plate.

In an embodiment, the number of the undertaking platform is two, the two undertaking platforms are respectively arranged on left and right sides of the bearing block, each of the two undertaking platform is equipped with two elastic members, and the two elastic members are respectively located on front and rear sides of the support shaft.

In an embodiment, the cover plate is provided with a mounting groove that accommodates the support shaft and protrudes outward, a middle of the mounting groove is provided with a mounting hole for exposing the bearing block, and the bearing block is fixedly connected with the cover plate.

In an embodiment, the number of the mainboard box is two, the two mainboard boxes are respectively arranged on two sides of the steering shaft, a middle part of the transmission member is fixed on the steering shaft, and two free ends of the transmission member extend above the two mainboard boxes, respectively.

In an embodiment, the pedal base includes an upper shell and a lower shell which are buckled together to form a mounting cavity; and
  the shaft rod of the support shaft extends along the length direction of the pedal base and is fixedly connected with the upper shell.

In an embodiment, a mounting base is supported between the shaft rod of the support shaft and an inner end face of the upper shell, and mounting bolts are respectively arranged to pass through the shaft rod of the support shaft and the mounting base below the shaft rod of the support shaft to realize a fixed connection of the support shaft and the mounting base.

In an embodiment, an upper end face of the mounting base is provided with a downward depression to form a groove body snapped with the shaft rod of the support shaft.

In an embodiment, a wheel shaft of one of the hubs extends inwards in a horizontal direction to form the support shaft.

In an embodiment, a wheel shaft of each of the hubs is inserted at an outer end of the support shaft, and fixed bolts are arranged to fix and connect the wheel shaft and the support shaft after passing through the wheel shaft and the support shaft radially.

In an embodiment, the self-balancing vehicle further includes: a power component configured to provide power for the control mainboard, and the power component is arranged in a battery box; and
  the battery box is installed on the upper shell, and a middle of the battery box is provided with a gap for the support shaft to pass through.

In an embodiment, the self-balancing vehicle further includes: a reset assembly including an elastic member and a support base;
  the support base is fixedly connected with the pedal base;
  the support base is provided with a shaft mounting groove and an elastic support groove, and the steering shaft is rotatably accommodated in the shaft mounting groove;
  the elastic support groove is arranged perpendicular to a length direction of the shaft mounting groove, and a bottom surface of the elastic support groove at its middle part is lower than a bottom surface of the elastic support groove at its two ends;
  the elastic member is adaptively accommodated in the elastic support groove, the elastic member vertically penetrates through a shaft body of the steering shaft or is accommodated in the elastic accommodation groove at a lower portion of the steering shaft.

A self-balancing vehicle, includes: a pedal base, a control rod, a steering shaft, a transmission member, mainboard boxes configured to install at least one control mainboard, two hubs, a support shaft, bearing blocks, elastic members and undertaking platforms;
  a lower portion of the control rod is provided with the steering shaft capable of rotating along with swinging of the control rod, and the steering shaft is rotatably connected with the pedal base; the transmission member is connected with the steering shaft, thereby the transmission member is capable of rotating along with the rotating of the steering shaft; and the support shaft is extended along a length direction of the pedal base and arranged in the pedal base, and the two hubs are respectively provided with two ends of the support shaft;
  the steering shaft is extended and arranged along a length direction perpendicular to the support shaft, the mainboard boxes are hinged on a rod body of the support shaft, the transmission member is fixed at an end of the steering shaft, and free ends of the transmission member are suspended above the mainboard boxes, respectively; and
  each of the bearing blocks is fixedly connected with a corresponding one of the mainboard boxes, and the support shaft is rotatably threaded through the bearing blocks; the undertaking platforms are fixed on the support shaft, each of the undertaking platforms forms a reset space together with a corresponding one of the mainboard boxes, the elastic members are disposed in the reset spaces formed by the undertaking platforms and the mainboard boxes; and an end of each of the elastic members is connected with a corresponding one of the undertaking platforms, and another end of each the elastic member is connected to a corresponding one of the mainboard boxes.

In an embodiment, a middle of each of the mainboard boxes is hinged on the rod body of the support shaft through the corresponding bearing block, and a length direction of each the mainboard box is parallel to a length extension direction of the steering shaft; and
  the number of the mainboard boxes is two, a middle of the transmission member is fixed at an end of the steering shaft, the two mainboard boxes are respectively located on two sides of the steering shaft, and two free ends of the transmission member are respectively located above the two mainboard boxes.

In an embodiment, each of the two mainboard boxes is provided with a mounting gap for the support shaft to pass through, and the bearing blocks are respectively located in the mounting gaps of the two mainboard boxes; and
  each the mainboard box further includes a cover plate configured to cover the mounting gap; and the undertaking platforms are located in the mounting gaps of the mainboard boxes and under the cover plates of the mainboard boxes; and a lower end of each the elastic member is connected with an upper end face of the corresponding undertaking platform, and an upper end of each the elastic member is connected with an inner end face of the cover plate of the corresponding mainboard box.

The mainboard box in technical solutions is used to install the control mainboard of the self-balancing vehicle. The control mainboard is integrated with a gyroscope. When the balance state of the mainboard box is broken by external force, the gyroscope senses the signal of its changing direction and transmits the signal to the control module (e.g., processor) on the control mainboard. The control module sends instructions to the motor that controls the hub movement according to the signal, and the motor that receives the signal controls the hub to make corresponding movement, thereby to realize the steering adjustment of the self-balancing vehicle.

In the above embodiments, the mainboard box is hinged in the cavity of the pedal base, during the normal operation of the self-balancing vehicle, the mainboard box maintains the balance state; When the user standing on the pedal base needs to change his direction of travel, the user manually swings the control rod to the direction he wants to go, then the steering shaft and the transmission member connected with the control rod will also rotate in the corresponding direction with the control rod, and during the rotating process of the transmission member, it will interfere with the mainboard box within its rotation interference range. The interference here can be a mechanical collision without a direct connection between the two, or it can be the interference between towing and being towed when there is a connection between the two. The specific implementation solutions with the same or equivalent technical effects that can be thought of by those skilled in the art without creative work should be considered to fall into the scope of protection of the disclosure.

After being interfered, the hinged mainboard box will rotate or swing around its hinge shaft according to the rotation direction of the transmission member, and the direction change signal generated by such rotation or swing is sensed by a gyroscope on the control mainboard in the mainboard box. The gyroscope transmits the signal to the control module (e.g., processor) on the control mainboard, and the control module sends instructions to the motor controlling the hub movement according to the signal. The motor receiving the signal controls the hub to make corresponding movement to realize the steering adjustment of the self-balancing vehicle.

In addition, compared with the self-balancing vehicle with the control rod in the related art, the self-balancing vehicle with the control rod in the technical solution of the disclosure has fewer parts in the frame structure, and the support shaft is connected to the hubs (i.e., hub motors) as the frame, which reduces the weight and cost of the whole vehicle. It should be noted that this frame structure is also applicable to the self-balancing vehicle including the control rod and the control mainboard through Hall steering on the market.

BRIEF DESCRIPTION OF DRAWINGS

In order to more clearly explain embodiments of the disclosure or the technical solutions in the related art, the following will briefly introduce the drawings needed in the embodiments or the description of the related art. It is obvious that the drawings in the following description are only some of the embodiments of the disclosure. For those skilled in the art, other drawings can also be obtained according to the structure shown in these drawings without any creative work.

DESCRIPTION OF REFERENCE SYMBOLS

Figure 1:
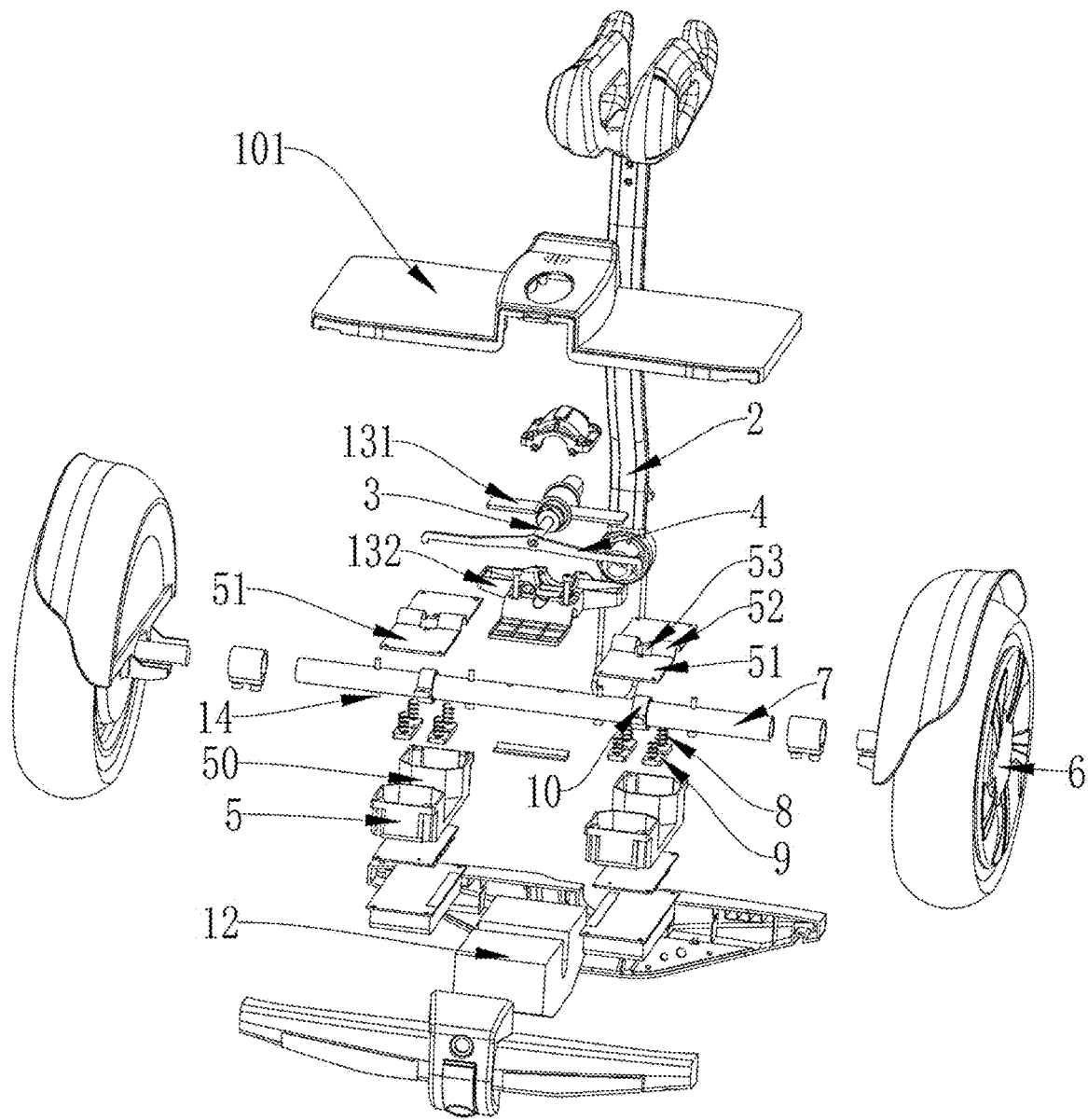
FIG. 1 illustrates an exploded view of a self-balancing vehicle according to an embodiment of the disclosure.
Figure 2:
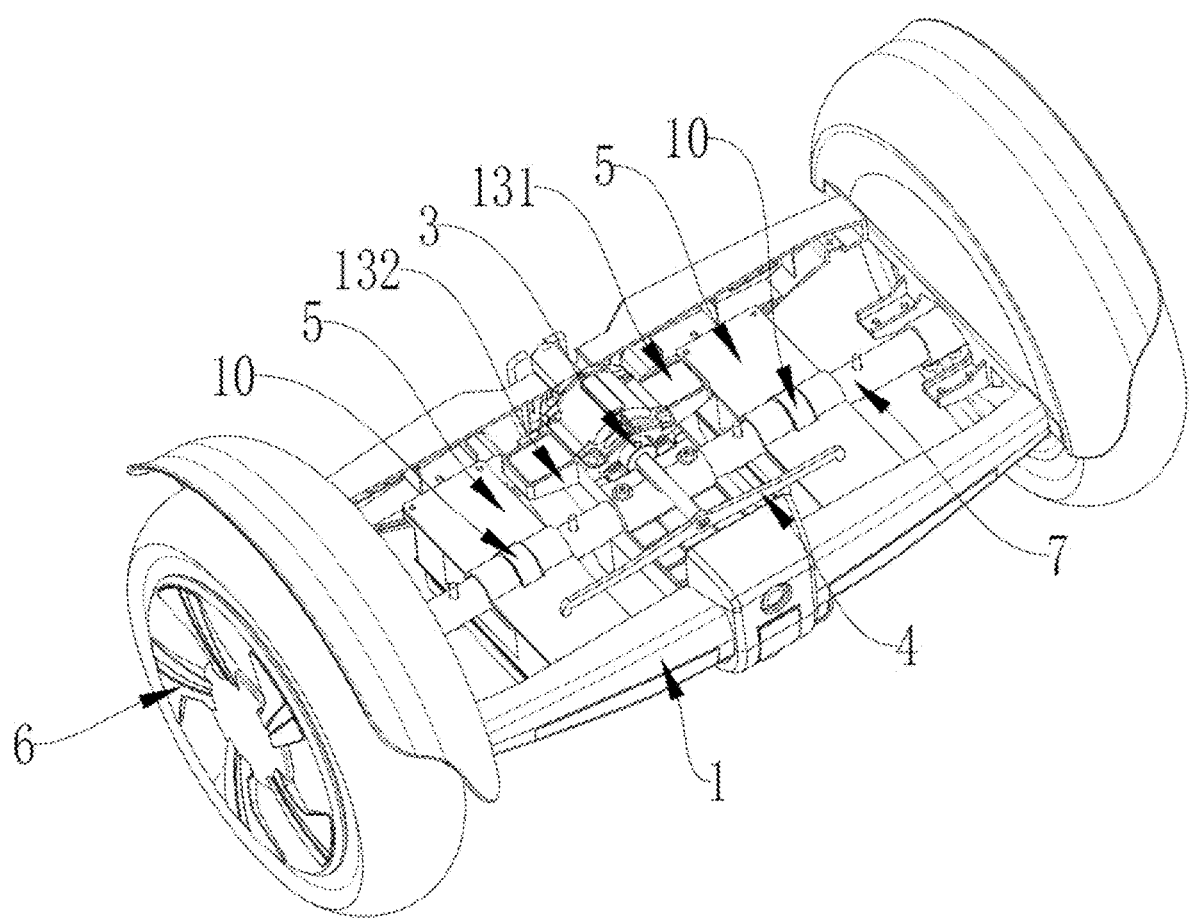
FIG. 2 illustrates an internal structure diagram of a self-balancing vehicle according to an embodiment of the disclosure.
Figure 3:
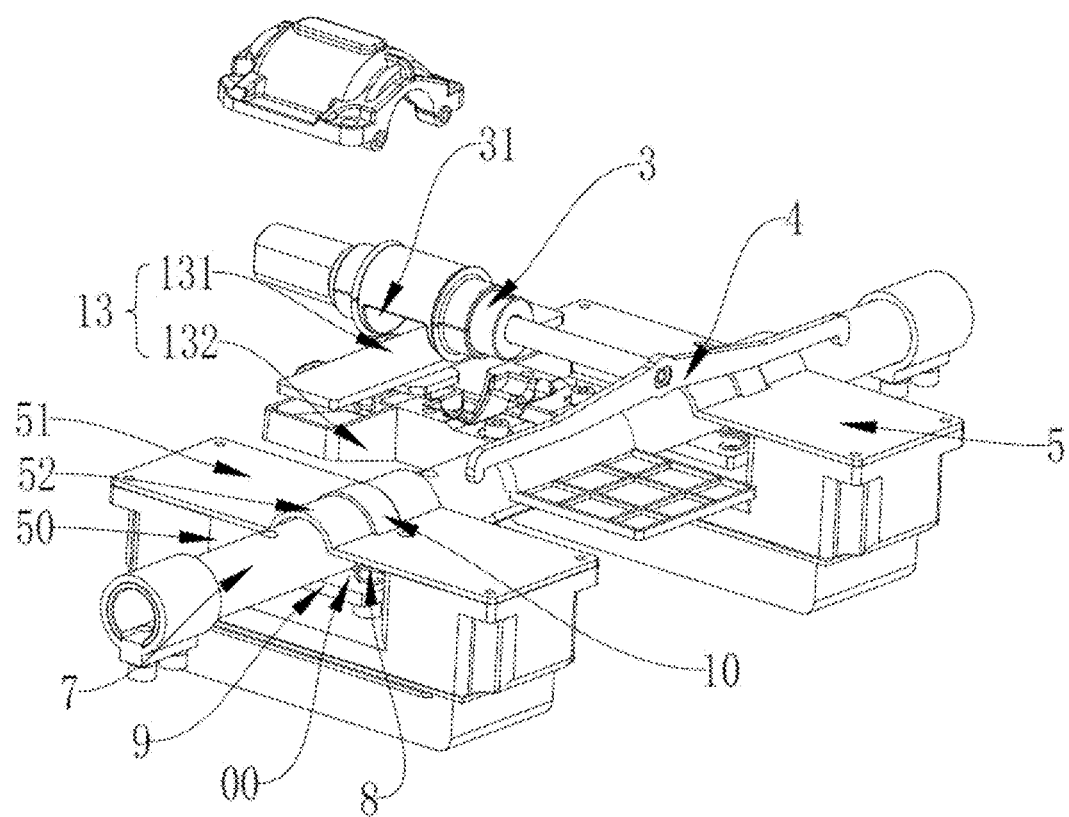
FIG. 3 illustrates a schematic diagram of an assembly method of a mainboard box and a support shaft according to an embodiment of the disclosure.

1: pedal base; 101: upper shell;
2: control rod; 3: steering shaft; 31: elastic accommodation groove; 4: transmission member; 41: U-shaped groove;
5: mainboard box; 50: mounting gap; 51: cover plate; 52: mounting groove; 53: mounting hole; 54: transmission platform;
6: hub; 7: support shaft; 8: elastic member; 9: undertaking platform; 00: reset space; 10: bearing block; 11: mounting base; 12: battery box; 121: gap;
13: reset assembly; 131: elastic member; 132: support base; 1321: shaft mounting groove; 1322: elastic support groove; 14: mounting bolt; 15: hinge base.

The realization, functional features and advantages of the disclosure will be further described with reference to the attached drawings in combination with the embodiments.

DETAILED DESCRIPTION OF EMBODIMENTS

The following will give a clear and complete description of the technical solution in the embodiments of the disclosure in combination with the drawings in the embodiments of the disclosure. Apparently, the described embodiments are only some of the embodiments of the disclosure, not all of them. Based on the embodiments in the disclosure, all other embodiments obtained by those skilled in the art without creative work fall within the scope of protection of the disclosure.

It should be noted that if the embodiment of the disclosure involves directional indication (such as up, down, left, right, front, rear . . . ), the directional indication is only used to explain the relative position relationship and movement situation between components under a certain attitude (as shown in the attached figure). If the specific attitude changes, the directional indication will also change accordingly.

In addition, if there is a description of "first", "second", etc. in the embodiment of the disclosure, the description of "first", "second", etc. is only for the purpose of description, and cannot be understood as indicating or implying its relative importance or implying the number of indicated technical features. Therefore, the features defined as "first" and "second" can include at least one of these features explicitly or implicitly. In addition, the technical solutions of various embodiments can be combined with each other, but it must be based on the realization of those skilled in the art. When the combination of technical solutions is contradictory or impossible to achieve, it should be considered that the combination of technical solutions does not exist and is not within the scope of protection required by the disclosure.

The technical solutions of the disclosure are further described below in combination with FIGS. 1-7 and related embodiments.

A self-balancing vehicle includes a pedal base 1 and a control rod 2, a lower portion of the control rod 2 is provided with a steering shaft 3 which can rotate along with swinging of the control rod 2, and the steering shaft 3 is rotatably connected with the pedal base 1.

The self-balancing vehicle further includes a transmission member 4 and mainboard boxes 5 used to mount at least one control mainboard. The transmission member 4 is connected with the steering shaft 3 so as to rotate along with the rotating of the steering shaft 3, and the mainboard boxes 5 are hinged in a cavity of the pedal base 1 and located within a rotation interference range of the transmission member 4. When the transmission member 4 rotates, the mainboard boxes 5 rotate or swing with the interference of the transmission member 4.

In the technical solution, the mainboard box 5 is used to install the control mainboard of the self-balancing vehicle, and the control mainboard is integrated with a gyroscope. When a balance state of the mainboard box 5 is broken by external force, the gyroscope senses a signal of its changing direction and transmits the signal to a control module on the control mainboard. The control module sends an instruction to a motor controlling the hub movement according to the signal, and the motor receiving the signal controls the hub to make corresponding movement, so as to realize the steering adjustment of the self-balancing vehicle.

In the embodiment, the mainboard box 5 is hinged in the internal cavity of the pedal base 1, and the mainboard box 5 maintains a balanced state during the normal operation of the self-balancing vehicle; When a user standing on the pedal base 1 needs to change its direction of travel, the user manually swings the control rod 2 to a direction he wants to go, then the steering shaft 3 and the transmission member 4 connected with it will also rotate in the corresponding direction with the control rod 2, and the transmission member 4 will interfere with the mainboard box 5 within the rotation interference range. The interference here can be a mechanical collision without a direct connection between the two, or it can be the interference between towing and being towed when there is a connection between the two, and so on; The specific implementation solutions with the same or equivalent technical effects that can be thought of by those skilled in the art without creative work should be considered to fall into the scope of protection of the disclosure.

After being interfered, the hinged mainboard box 5 will rotate or swing around its hinge shaft according to the rotation direction of the transmission member 4, and the direction change signal generated by such rotation or swing is sensed by the gyroscope on the control mainboard in the mainboard box 5, which transmits the signal to the control module on the control main board, and the control module sends instructions to the motor controlling the hub movement according to the signal, the motor receiving the signal controls the hub to make corresponding movement to realize the steering adjustment of the self-balancing vehicle.

For the specific implementation structure to realize the mechanical transmission of motion signals between the transmission member 4 and the mainboard box 5, there are many preferred implementation methods as follows:

The first implementation method is that the transmission member 4 is hinged on the mainboard box 5. In this embodiment, the transmission member 4 has a direct connection with the mainboard box 5. When the transmission member 4 is rotated by the control rod 2, the mainboard box 5 is rotated or swung in the same direction with its hinge shaft as the pivot. Since the transmission member 4 has a direct hinging relationship with the mainboard box 5, the different rotation directions of the transmission member 4 can provide the power source for the mainboard box 5 to move around its hinge shaft in two opposite directions, and can adapt to the control mainboards of different types of self-balancing vehicles (some types of self-balancing vehicles have only one control mainboard, which can realize the adjustment of the left and right movement directions; some types of self-balancing vehicles have two control mainboards, which respectively control the adjustment of the left and right movement directions), the mass production of manufacturers can be facilitated.

Figure 6:
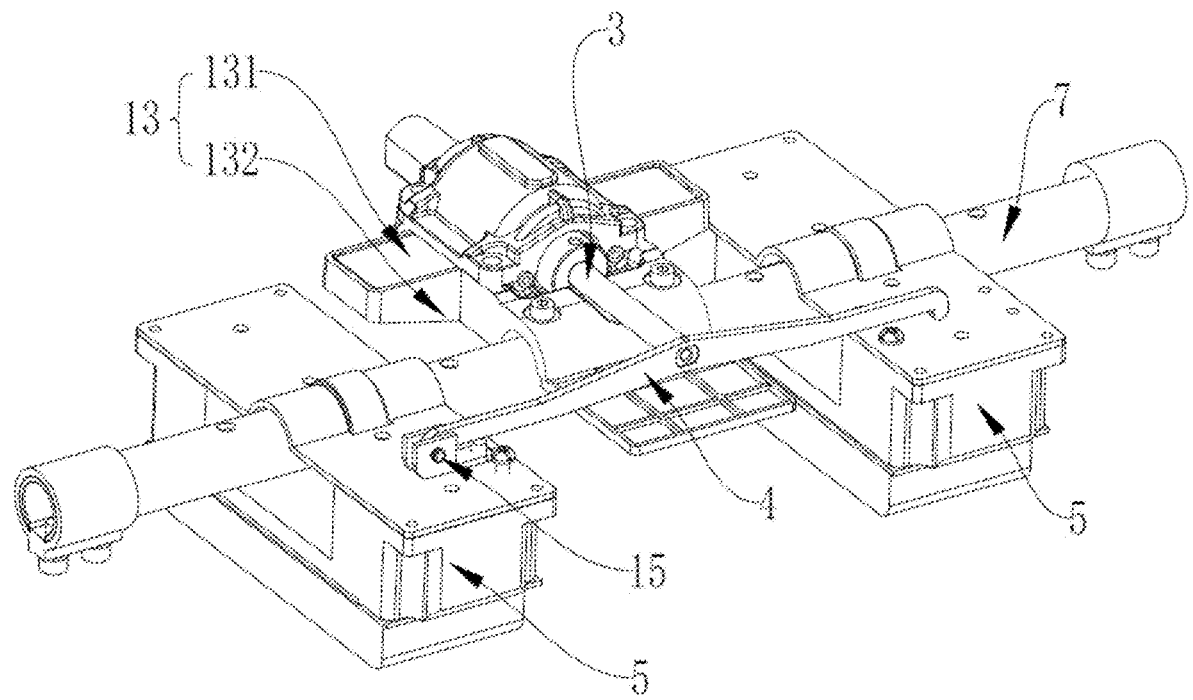
FIG. 6 illustrates a schematic diagram of a positional installation relationship between the mainboard box and a transmission member according to an embodiment of the disclosure.

The specific hinge structure can be as follows: as shown in FIG. 6, the mainboard box 5 is provided with a hinge base 15, the hinge base 15 is provided with a U-shaped hinge groove, an end of the transmission member 4 is inserted into the U-shaped hinge groove, and the hinge shaft is provided to pass through the transmission member 4 and the U-shaped hinge groove and then hinge the two.

Figure 7:
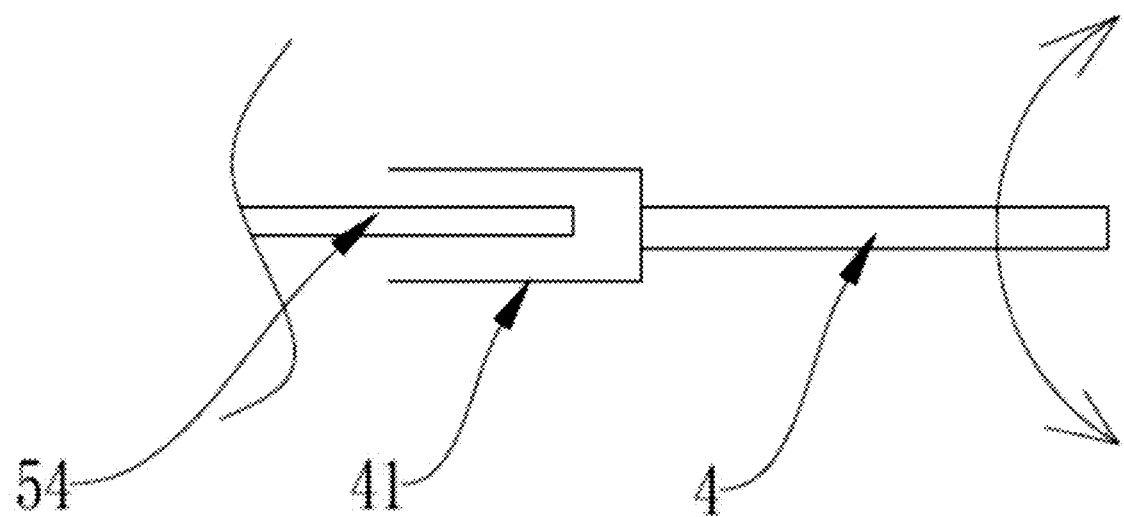
FIG. 7 illustrates a schematic diagram of a positional installation relationship between the mainboard box and a transmission member according to another embodiment of the disclosure.

The second implementation method is that an end of the transmission member 4 is provided with a U-shaped groove 41 with an opening outward, and the mainboard box 5 is provided with a transmission platform 54 that can extend into the U-shaped groove 41, as shown in FIG. 7. In the balanced state of this embodiment, the transmission platform 54 is suspended in the middle of the U-shaped groove 41. When the transmission member 4 in the figure moves clockwise, the lower portion of the U-shaped groove 41 provides upward tangential force for the rotation of the mainboard box 5; When the transmission member 4 moves counterclockwise, the upper portion of the U-shape groove 41 provides downward tangential force for the rotation of the mainboard box 5, that is, one mainboard box can realize the adjustment of the self-balancing vehicle in at least two directions of movement. In this embodiment, the transmission member 4 and the mainboard box 5 realize the mechanical collision without direct connection through the specific structure, and can also provide the power source for the mainboard box 5 to move around its hinge shaft in two opposite directions when the rotation directions of the transmission member 4 are different, it can adapt to the control mainboards of different models of self-balancing vehicles (some models of self-balancing vehicles have only one control mainboard, which can realize the adjustment of left and right movement direction; some models of self-balancing vehicles have two control mainboards, which can control the adjustment of left and right movement direction respectively), facilitating the mass production of manufacturers.

Figure 4:
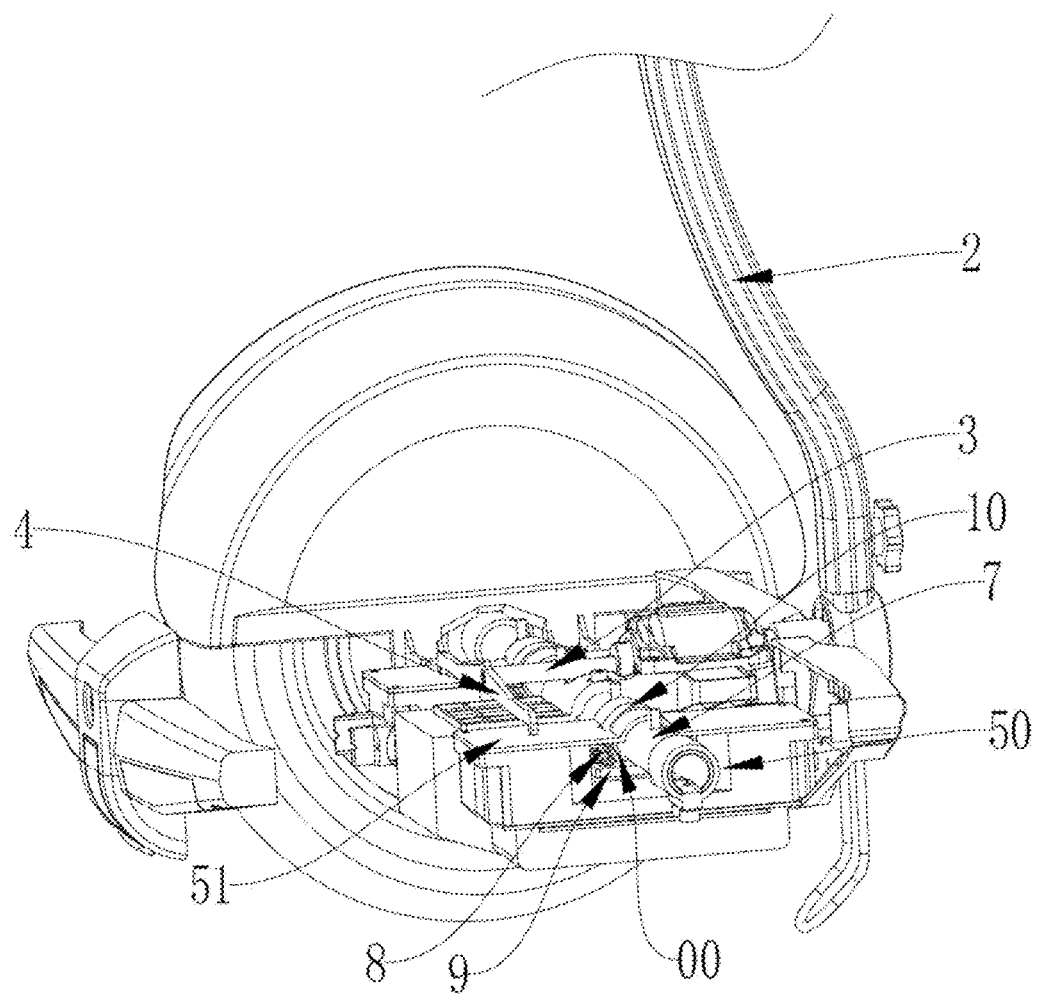
FIG. 4 illustrates a side view of the assembly method of the mainboard box and the support shaft according to an embodiment of the disclosure.
Figure 5:
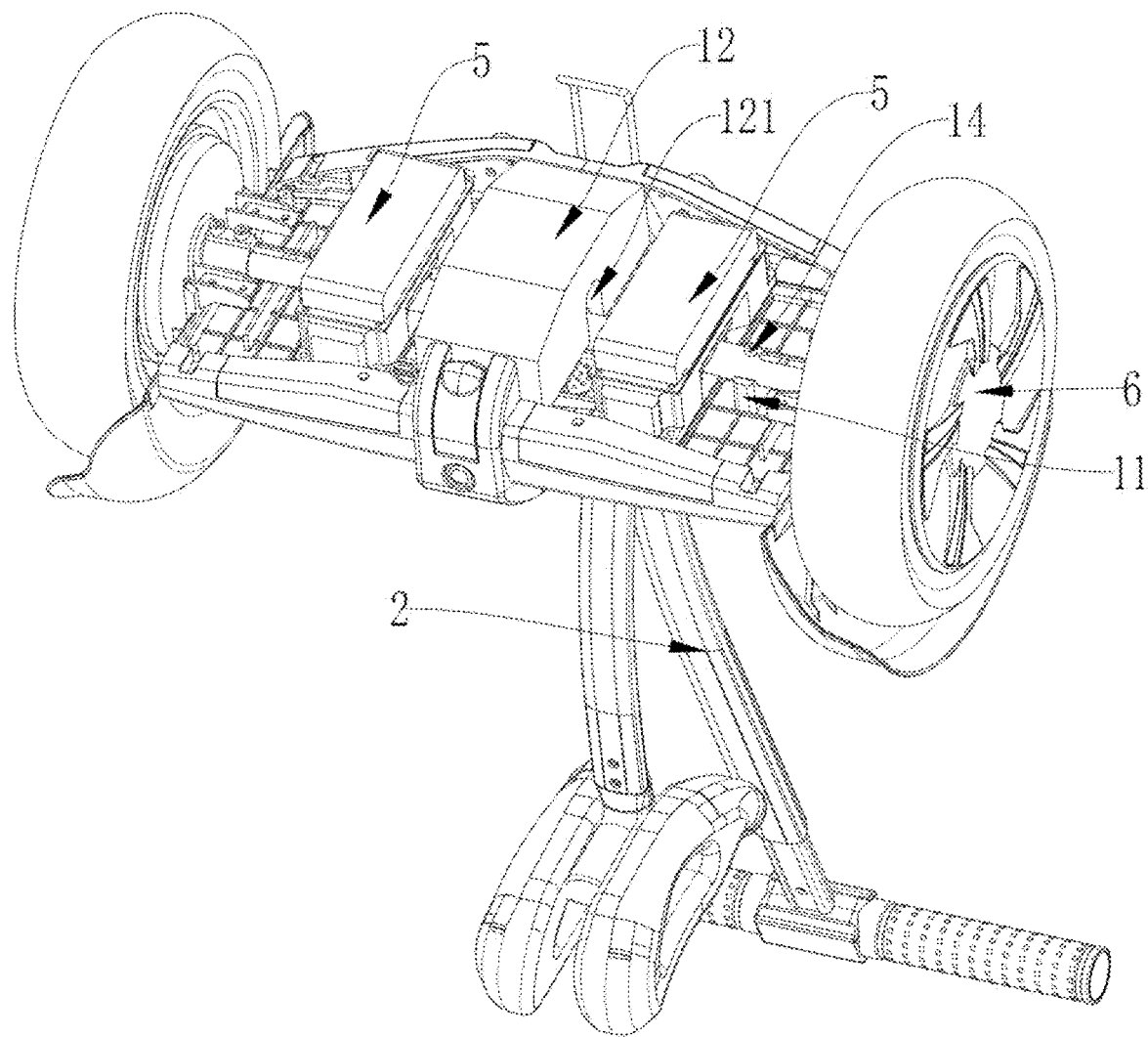
FIG. 5 illustrates a schematic diagram of an internal structure of the self-balancing vehicle according to an embodiment of the disclosure (viewed from the bottom).

The third implementation method is as follows: as shown in FIG. 4, the mainboard box 5 is located at the side of the steering shaft 3, the transmission member 4 is fixed on the steering shaft 3, the transmission member 4 is suspended at the upstream of the starting position of rotating or swinging of the mainboard box 5, the transmission member 4 rotates and continues to move forward when it rotates near the mainboard box 5, which will provide a driving force for the rotating or swinging of the mainboard box 5. In this embodiment, the transmission member 4 and the mainboard box 5 have no direct connection relationship, which avoids the constraint of freedom caused by direct connection (such as articulation), making the whole adjustment of the self-balancing vehicle more flexible and convenient.

Preferably, the transmission member 4 is of strip plate structure, and its ends are provided with bending parts extending vertically outward, which is simple in structure, and the bending parts can better provide a point of force when interference between the transmission member 4 and the mainboard box 5 is happened.

In the technical solution, the mainboard box 5 is hinged in the inner cavity of the pedal base 1 of the self-balancing vehicle, and the position of the hinge is not specifically limited. As long as its installation position is compatible with the transmission member 4, the mainboard box 5 can swing or rotate with the help of the force generated by the rotation of the transmission member 4. Specifically, the mainboard box 5 can be hinged on the upper cover of the pedal base 1 or the lower cover of the pedal base 1.

Similar to all self-balancing vehicles in the related art, the self-balancing vehicle of this technical solution also includes hubs 6 and a support shaft 7. The hubs 6 are arranged at the ends of the support shaft 7 respectively. The support shaft 7 extends along the length direction of the pedal base 1, and the hub 6 is driven by the motor.

For the hinge position of the mainboard box 5, the hinge is preferably set on the shaft rod of the support shaft 7, that is, the support shaft 7 acts as the hinge shaft of the mainboard box 5 while bearing the function of connecting the hub 6, which greatly saves the assembly structure and space.

In particular, the self-balancing vehicle in this embodiment is further provided with elastic members 8, which can be used for the mainboard box 5 to quickly return to the balance position on the one hand, and on the other hand, based on the recovery force of elastic members 8 in the compression state, the mainboard box 5 in the balance state can be maintained more stable.

The elastic members 8 can be arranged in the cavity of the pedal base 1. An end of the elastic member 8 is connected to (abutted against) the inner wall of the cavity of the pedal base 1, and another end of the elastic member 8 is connected to (abutted against) the end face of the mainboard box 5. In the balance state, the compressed elastic member 8 continuously acts its restoring force on the mainboard box 5 and the inner wall of the cavity of the pedal base 1 to keep the mainboard box 5 in a stable state; When the mainboard box 5 rotates or swings in a certain direction, the elastic member 8 is stretched or further compressed to produce a restoring force that makes the mainboard box 5 return to the balance position, which is convenient for installation.

Another implementation method is to set the undertaking platforms 9 which are fixed in the cavity of the pedal base 1. The undertaking platforms 9 can be directly fixed on the inner wall of the cavity of the pedal base 1, or can be fixed on a component in the cavity of the pedal base 1, such as the support shaft 7. Specifically, the undertaking platform 9 and the mainboard box 5 form a reset space 00.

The elastic member 8 is arranged in the reset space 00, an end of which is connected to the undertaking platform 9 and the other end of which is connected to the mainboard box 5. The principle of action is the same as above, but this embodiment isolates the direct contact between the elastic member 8 and the shell of the pedal base 1, so as to avoid wrong guidance of the status of the elastic member 8 because the user stands on the pedal base 1 or encounters uneven roads, ensure accurate feedback of the status of the elastic member 8 and the mainboard box 5, and improve performance.

Preferably, the undertaking platform 9 is fixedly connected with the support shaft 7, completely isolating the contact between the elastic member 8 and the pedal base 1, with the best effect.

Preferably, the mainboard box 5 is provided with a mounting gap 50 through which the support shaft 7 penetrates through. The mounting gap 50 is provided with a bearing block 10 therein. The support shaft 7 rotatably penetrates through the bearing block 10. The bearing block 10 is fixedly connected with the mainboard box 5.

The mainboard box 5 further includes a cover plate 51 covering the mounting gap 50. The undertaking platform 9 is located in the mounting gap 50 and under the cover plate 51. The lower end of the elastic member 8 is connected with the upper end face of the undertaking platform 9, and the upper end of the elastic member is connected with the inner end face of the cover plate 51.

In this embodiment, the bearing block 10 which is fixedly connected with the mainboard box 5 is set, on the one hand, the smooth rotation of the mainboard box 5 around the support shaft 7 is ensured, on the other hand, it also plays a positioning role, to avoid the relative movement of the support shaft 7 and the mainboard box 5 along its length direction.

The mainboard box 5 is provided with a mounting gap 50 to increase the contact area and increase the friction between the mainboard box 5 and the support shaft 7, so as to ensure the stability of the mainboard box 5 in the balanced state and not be easily shaken.

Preferably, the two undertaking platforms 9 are respectively arranged on the left and right sides of the bearing block 10. Each undertaking platform 9 is equipped with two elastic members 8, and the two elastic members 8 are respectively located on the front and rear sides of the support shaft 7, which has better stability.

Preferably, the cover plate 51 is provided with a mounting groove 52 that accommodates the support shaft 7 and protrudes outwards. The middle of the mounting groove 52 is provided with a mounting hole 53 for the exposure of the bearing block 10. The bearing block 10 is fixedly connected with the cover plate 51 to increase the contact area and increase the friction between the mainboard box 5 and the support shaft 7, so as to ensure the stability of the mainboard box 5 in a balanced state and not be easily shaken.

Preferably, two mainboard boxes 5 are respectively arranged on two sides of the steering shaft 3, the middle of the transmission member 4 is fixed on the steering shaft 3, and its two free ends are respectively extended above the two mainboard boxes 5 to control the adjustment of the left and right movement directions.

In this embodiment, the pedal base 1 of the self-balancing vehicle includes an upper shell 101 and a lower shell which are buckled together to form a mounting cavity.

The shaft rod of the support shaft 7 extends along the length direction of the pedal base 1 and is fixedly connected with the upper shell 101. The outer end face of the pedal base 1 is the place where the user stands. In this embodiment, the support shaft 7 is directly fixed on the upper shell 101, which improves the support strength of the pedal base 1.

Further, in order to improve the stability of the connection between the support shaft and the shell of the pedal base 1, a mounting base 11 is supported between the shaft rod of the support shaft 7 and the inner end face of the upper shell 101, and the mounting bolts 14 are respectively arranged to pass through the shaft rod of the support shaft 7 and the mounting base 11 below the support shaft in order to achieve the fixed connection between the support shaft 7 and the mounting base 11.

Preferably, the upper end face of the mounting base 11 is provided with a downward depression to form the groove body snapped with the shaft rod of the supporting shaft 7.

For the specific installation structure of the support shaft 7 and the hub 6 of the self-balancing vehicle, there are many ways to realize it. One of the preferred ways is that the wheel shaft of the hub 6 and the support shaft 7 are integrated with the same shaft. When the support shaft rotates, the hub 6 rotates directly with it. Specifically, the wheel shaft of the hub 6 extends to the right along the horizontal direction to form the support shaft 7, which is simple in structure and simplifies the installation method. Compared with the self-balancing vehicle with the control rod in the prior art, the self-balancing vehicle with the control rod in this embodiment has fewer parts (accessories) in the frame structure, the support shaft is connected to the hub (hub motor) as the frame in the middle, which reduces the weight and cost of the whole vehicle. It should be noted that this frame structure is also applicable to the self-balancing vehicle including the control rod and the control mainboard through Hall steering on the market.

Another preferred embodiment is that the wheel shaft of the hub 6 and the support shaft are connected by bolts after being inserted through shafts with large and small diameter, when the support shaft rotates, the hub 6 which is connected to the support shaft by the drive rotates along with the rotating of the support shaft. Specifically, the wheel shaft of the hub 6 is inserted at the outer end of the support shaft 7, and the fixed bolt is arranged to pass through the wheel shaft and the support shaft 7 in a radial direction and then connect them.

Further, the self-balancing vehicle in this embodiment further includes a power component that provides power for the control mainboard, and the power component is arranged in the battery box 12.

The battery box 12 is installed on the upper shell 101. The middle of the battery box 12 is provided with a gap 121 for the support shaft 7 to pass through. The compact installation structure improves the stability of the internal structure.

Further, the self-balancing vehicle in this embodiment further includes a reset assembly 13, which includes an elastic member 131 and a support base 132.

The support base 132 is fixedly connected with the pedal base 1.

The support base 132 is provided with a shaft mounting groove 1321 and an elastic support groove 1322, and the steering shaft 3 is rotatably accommodated in the shaft mounting groove 1321;

The elastic support groove 1322 is arranged perpendicular to the length direction of the shaft mounting groove 1321, and the bottom surface of the elastic support groove 1322 at the middle part is lower than the bottom surface of the elastic support groove 1322 at two ends.

Figure 8:
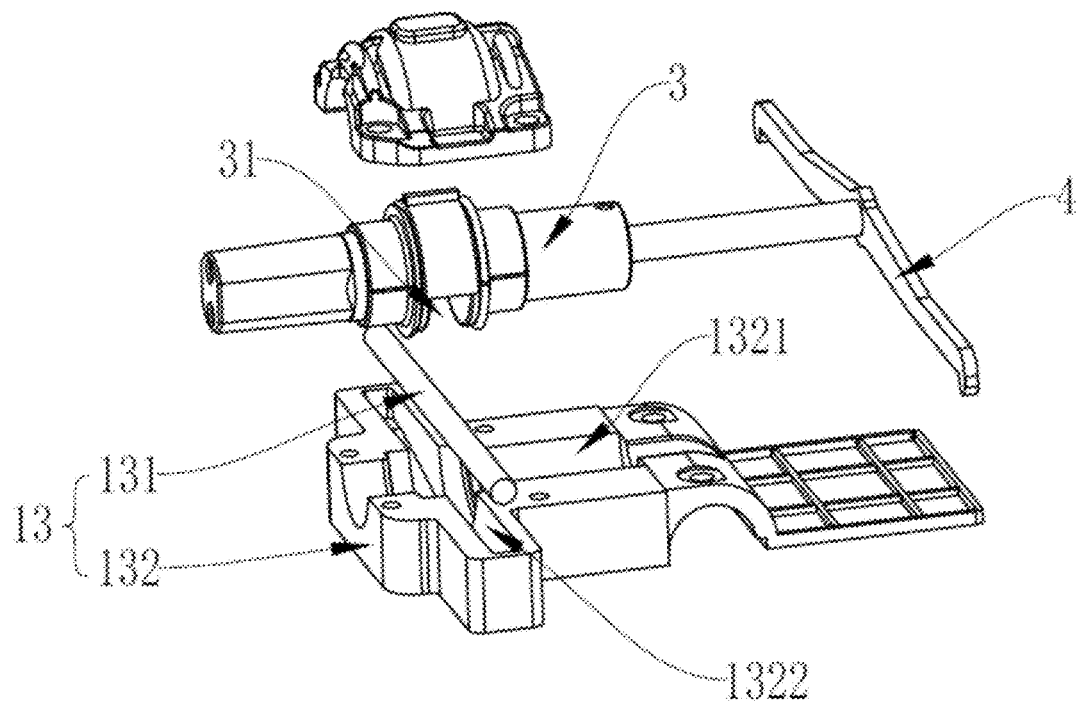
FIG. 8 illustrates a exploded view of a reset structure according to an embodiment of the disclosure.
Figure 9:
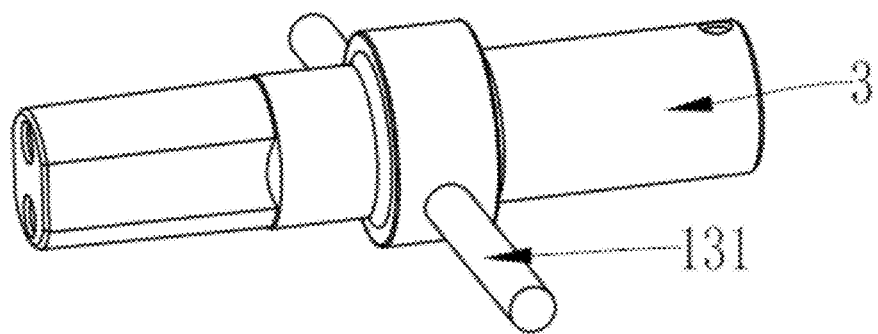
FIG. 9 illustrates a schematic structural diagram of a steering shaft and an elastic member according to another embodiment of the disclosure.

The elastic member 131 is adaptively accommodated in the elastic support groove 1322, which vertically penetrates the shaft body of the steering shaft 3 (as shown in FIG. 9) or is accommodated in the elastic accommodation groove 31 at the lower portion of the steering shaft 3 (as shown in FIG. 8).

The shaft mounting groove 1321 and the elastic support groove 1322 in this embodiment are arranged in a crisscross manner. The intersection of the two forms a middle groove with a larger groove depth (compared with the groove depth of the rest of the shaft mounting groove 1321 and the elastic support groove 1322). The two ends of the elastic member 131 are accepted by the bottom surface of the elastic support groove 1322 at the two ends except the middle groove. The installation mode of the middle groove and the elastic member 131 makes it have elastic deformation space. Preferably, the elastic member 131 can be an elastic shaft or an elastic sheet.

When the steering shaft 3 is driven to rotate by the control rod 2, the steering shaft 3 squeezes the elastic member 131 which is penetrated through the steering shaft 3 or contained in the elastic accommodation groove 31 at its lower portion of the steering shaft 3 to make the elastic member 131 generate elastic deformation. The restoring force generated by the elastic deformation reversely acts on the steering shaft 3, so that when the external force acting on the control rod 2 disappears, the steering shaft 3 can automatically drive the control rod 2 to quickly return to the center and vertical position.

In the optimal implementation mode, a self-balancing vehicle in the technical solution includes a pedal seat 1, a control rod 2, a steering shaft 3, a transmission member 4, two mainboard boxes 5, hubs 6, a support shaft 7, elastic members 8, undertaking platforms 9 and bearing blocks 10.

The lower portion of the control rod 2 is provided with the steering shaft 3 capable of rotating along with swinging of the control rod 2, the steering shaft 3 is rotatably connected with the pedal base 1, and the transmission member 4 is connected with the steering shaft 3 to rotate along with the rotating of the steering shaft 3; the support shaft 7 is extended along a length direction of the pedal base 1 and arranged in the pedal base 1, and two hubs 6 are respectively disposed on two ends of the support shaft 7.

The steering shaft 3 is extended and arranged along the length direction perpendicular to the support shaft 7. The middle of the mainboard box 5 is hinged on the rod body of the support shaft 7 through the bearing block 10, the bearing block 10 is fixedly connected with the mainboard box 5, and the length direction of the mainboard box 5 is parallel to the length extension direction of the steering shaft 3. The middle part of the transmission part 4 is fixed at an end of the steering shaft 3, the two mainboard boxes 5 are respectively located at two sides of the steering shaft 3, and the two free ends of the transmission member 4 are respectively located above the two mainboard boxes 5.

The undertaking platforms 9 are fixed on the support shaft 7, the undertaking platform 9 and the mainboard box 5 form a reset space 00. The elastic member 8 is arranged in the reset space 00, an end of which is connected to the undertaking platform 9, and the other end of which is connected to the mainboard box 5.

When in use (take turning left as an example), the user turns the control rod 2 to the left. the steering shaft 3 and the transmission member 4 turn counterclockwise at the same time. The left end of the transmission member 4 is pressed down, and the right end of the transmission member 4 is warped up. The left end of the pressing down continues to transmit the downward pressure to the left mainboard box 5, causing the left mainboard box 5 to rotate around the support shaft 7, The gyroscope on the control mainboard in the mainboard box 5 immediately senses its own deflection signal and transmits the signal to the control module on the control mainboard. The control module sends the instruction to the motor that controls the movement of the hub according to the signal, and the motor that receives the signal controls the hub to move to the left to realize the steering adjustment of the self-balancing vehicle.

When the left mainboard box 5 rotates around the support shaft 7, the elastic member 8 will be pulled downward, and based on its elastic characteristics, it will generate an upward recovery force to help the left mainboard box 5 return to the balance position as soon as possible after the steering is completed.

The above is only the preferred embodiments of the disclosure and does not limit the scope of the disclosure. Under the invention concept of the disclosure, the equivalent structure transformation made by using the description of the disclosure and the attached drawings, or the direct/ indirect application in other relevant technical fields, are included in the protection scope of the disclosure.

What is claimed is:

1. A self-balancing vehicle, comprising: a pedal base and a control rod, wherein a lower portion of the control rod is provided with a steering shaft capable of rotating along with swinging of the control rod, and the steering shaft is rotatably connected with the pedal base; and
wherein the self-balancing vehicle further comprises: a transmission member and a mainboard box configured to install a control mainboard; the transmission member is connected with the steering shaft, thereby the transmission member is capable of rotating along with the rotating of the steering shaft; and the mainboard box is hinged in a cavity of the pedal base and located within a rotation interference range of the transmission member, and when the transmission member rotates, the main board box rotates or swings with interference of the transmission member;
wherein the self-balancing vehicle further comprises hubs and a support shaft, the hubs are disposed on ends of the support shaft respectively, and the support shaft is extended along a length direction of the pedal base; and
wherein the mainboard box is hinged on a shaft rod of the support shaft.

2. The self-balancing vehicle according to claim 1,
wherein the transmission member is hinged on the mainboard box; or
wherein an end of the transmission member is provided with a U-shaped groove with an opening outward, and the mainboard box is provided with a transmission platform capable of extending into the U-shaped groove; or
wherein the mainboard box is located at a side of the steering shaft, the transmission member is fixed on the steering shaft, and the transmission member is suspended at an upstream of a starting position of rotating or swinging of the mainboard box.

3. The self-balancing vehicle according to claim 2, wherein the transmission member is of strip plate structure, and ends of the transmission member are provided with bending parts extending vertically outward, respectively.

4. The self-balancing vehicle according to claim 1, wherein the self-balancing vehicle further comprises an elastic member, disposed in the cavity of the pedal base; an end of the elastic member is connected with an inner wall of the cavity of the pedal base, and another end of the elastic member is connected with an end face of the mainboard box.

5. The self-balancing vehicle according to claim 1, wherein the self-balancing vehicle further comprises an elastic member and an undertaking platform, the undertaking platform is fixed in the cavity of the pedal base and forms a reset space together with the mainboard box; and
wherein the elastic member is disposed in the reset space, an end of the elastic member is connected with the undertaking platform, and another end of the elastic member is connected with the mainboard box.

6. The self-balancing vehicle according to claim 5, wherein the undertaking platform is fixedly connected to a support shaft configured to install hubs and disposed in the cavity of the pedal base; the mainboard box is provided with a mounting gap for the support shaft to pass through; and the mounting gap is provided with a bearing block therein, the support shaft is rotatably penetrates through the bearing block, and the bearing block is fixedly connected with the mainboard box; and
wherein the mainboard box further comprises a cover plate covering the mounting gap, the undertaking platform is located in the mounting gap and under the cover plate, a lower end of the elastic member is connected with an upper end face of the undertaking platform, and an upper end of the elastic member is connected with an inner end face of the cover plate.

7. The self-balancing vehicle according to claim 6, wherein the number of the undertaking platform is two, the two undertaking platforms are respectively arranged on left and right sides of the bearing block, each of the two undertaking platforms is equipped with two elastic members, and the two elastic members are respectively located on front and rear sides of the support shaft.

8. The self-balancing vehicle according to claim 6, wherein the cover plate is provided with a mounting groove that accommodates the support shaft and protrudes outward, a middle of the mounting groove is provided with a mounting hole for exposing the bearing block, and the bearing block is fixedly connected with the cover plate.

9. The self-balancing vehicle according to claim 1, wherein the number of the mainboard box is two, the two mainboard boxes are respectively arranged on two sides of the steering shaft, a middle part of the transmission member is fixed on the steering shaft, and two free ends of the transmission member extend above the two mainboard boxes, respectively.

10. The self-balancing vehicle according to claim 1, wherein the pedal base comprises an upper shell and a lower shell which are buckled together to form a mounting cavity; and
wherein the shaft rod of the support shaft extends along the length direction of the pedal base and is fixedly connected with the upper shell.

11. The self-balancing vehicle according to claim 10, wherein a mounting base is supported between the shaft rod of the support shaft and an inner end face of the upper shell, and mounting bolts are respectively arranged to pass through the shaft rod of the support shaft and the mounting base below the shaft rod of the support shaft to realize a fixed connection of the support shaft and the mounting base; and
wherein an upper end face of the mounting base is provided with a downward depression to form a groove body snapped with the shaft rod of the support shaft.

12. The self-balancing vehicle according to claim 1, wherein a wheel shaft of one of the hubs extends inwards in a horizontal direction to form the support shaft.

13. The self-balancing vehicle according to claim 1, wherein a wheel shaft of each of the hubs is inserted at an outer end of the support shaft, and fixed bolts are arranged to fix and connect the wheel shaft and the support shaft after passing through the wheel shaft and the support shaft radially.

14. The self-balancing vehicle according to claim 11, further comprising: a power component configured to provide power for the control mainboard, and the power component is arranged in a battery box; the battery box is installed on the upper shell, and a middle of the battery box is provided with a gap for the support shaft to pass through.

15. The self-balancing vehicle according to claim 1, further comprising: a reset assembly including an elastic member and a support base;
wherein the support base is fixedly connected with the pedal base;

wherein the support base is provided with a shaft mounting groove and an elastic support groove, and the steering shaft is rotatably accommodated in the shaft mounting groove;

wherein the elastic support groove is arranged perpendicular to a length direction of the shaft mounting groove, and a bottom surface of the elastic support groove at its middle part is lower than a bottom surface of the elastic support groove at its two ends;

wherein the elastic member is adaptively accommodated in the elastic support groove, the elastic member vertically penetrates through a shaft body of the steering shaft or is accommodated in an elastic accommodation groove at a lower portion of the steering shaft.

16. A self-balancing vehicle, comprising: a pedal base, a control rod, a steering shaft, a transmission member, mainboard boxes configured to install at least one control mainboard, two hubs, a support shaft, bearing blocks, elastic members and undertaking platforms;

wherein a lower portion of the control rod is provided with the steering shaft capable of rotating along with swinging of the control rod, and the steering shaft is rotatably connected with the pedal base; the transmission member is connected with the steering shaft, thereby the transmission member is capable of rotating along with the rotating of the steering shaft; and the support shaft is extended along a length direction of the pedal base and arranged in the pedal base, and the two hubs are respectively provided with two ends of the support shaft;

wherein the steering shaft is extended and arranged along a length direction perpendicular to the support shaft, the mainboard boxes are hinged on a rod body of the support shaft, the transmission member is fixed at an end of the steering shaft, and free ends of the transmission member are suspended above the mainboard boxes, respectively; and wherein each of the bearing blocks is fixedly connected with a corresponding one of the mainboard boxes, and the support shaft is rotatably threaded through the bearing blocks; the undertaking platforms are fixed on the support shaft, each of the undertaking platforms forms a reset space together with a corresponding one of the mainboard boxes, the elastic members are disposed in the reset spaces formed by the undertaking platforms and the mainboard boxes; and an end of each of the elastic members is connected with a corresponding one of the undertaking platforms, and another end of each of the elastic members is connected to a corresponding one of the mainboard boxes.

17. The self-balancing vehicle according to claim 16, wherein a middle of each of the mainboard boxes is hinged on the rod body of the support shaft through the corresponding bearing block, and a length direction of each of the mainboard boxes is parallel to a length extension direction of the steering shaft; and wherein the number of the mainboard boxes is two, a middle of the transmission member is fixed at an end of the steering shaft, the two mainboard boxes are respectively located on two sides of the steering shaft, and two free ends of the transmission member are respectively located above the two mainboard boxes.

18. The self-balancing vehicle according to claim 17, wherein each of the two mainboard boxes is provided with a mounting gap for the support shaft to pass through, and the bearing blocks are respectively located in the mounting gaps of the two mainboard boxes; and wherein each of the mainboard boxes further includes a cover plate covering the mounting gap; and the undertaking platforms are located in the mounting gaps of the mainboard boxes and under the cover plates of the mainboard boxes; and a lower end of each of the elastic members is connected with an upper end face of the corresponding undertaking platform, and an upper end of each of the elastic members is connected with an inner end face of the cover plate of the corresponding mainboard box.

* * * * *